United States Patent [19]

Black

[11] 4,321,954
[45] Mar. 30, 1982

[54] GAS PRESSURIZER

[75] Inventor: William L. Black, China Lake, Calif.

[73] Assignee: The United States of America as represented by the Secretary of the Navy, Washington, D.C.

[21] Appl. No.: 162,351

[22] Filed: Jun. 23, 1980

[51] Int. Cl.³ .............................................. B65B 3/10
[52] U.S. Cl. .................................... 141/329; 141/67; 141/100; 60/39.48; 60/259; 137/71; 251/62; 251/DIG. 1
[58] Field of Search ................. 60/259, 39.48; 141/18, 141/19, 329, 330, 311 R, 9, 100–107, 67, 68, 1, 4–8, 37–66; 251/62, DIG. 1; 137/67–77

[56] References Cited

U.S. PATENT DOCUMENTS 2,120,248 6/1938 Hinchman ........................... 141/329

Primary Examiner—Houston S. Bell, Jr.
Attorney, Agent, or Firm—Robert F. Beers; W. Thom Skeer

[57] ABSTRACT

A gas-pressurizer is disclosed. An enclosed canister surrounds a piercing mechanism, over the end of a pressure-conducting pipe. The piercing mechanism is comprised of an end-cap with portals therethrough, a stub, and a gas dispensing, piercing pintle riding upon the stub. When pressurized gas is sent through the pipe, it forces the pintle through the upper end of the canister, allowing the gas to pressurize a storage tank.

7 Claims, 2 Drawing Figures

4,321,954

GAS PRESSURIZER

BACKGROUND OF THE INVENTION

This invention is concerned with gas-pressurized systems. More particularly, it is concerned with a safe and reliable gas-pressurized system where the oxidizer and fuel for a hypergolic reaction must be introduced into a combustion chamber simultaneously.

The system is used in a rocket-powered target drone which is fueled by a storable liquid bipropellant. The bipropellant is composed of an oxidizer, such as inhibited red fuming nitric acid (IRFNA), and mixed amine fuel (MAF). These substances are stored in separate tanks in the drone, and react hypergolically when simultaneously introduced into the rocket's combustion chamber. When it is desired to fire the rocket motor, high pressure nitrogen is sent through a standpipe into each tank to force the two substances into the chamber.

The shelf life, and the actual safety of these drones is limited by the destructive reaction of the oxidizer's distillates on the gas-pressurizer in the IRFNA tank. Prior art gas pressurizers use a gold diaphragm to separate the end of the pressure standpipe and the oxidizer, and the acid formed by the distillation of the IRFNA corrodes this diaphragm. The acid enters the standpipe and reacts destructively with it. The corrosive reaction detracts from drone performance. In extreme cases, the acid can cause a leak to develop in the pressurizing gas flow pipe, which could allow the IRFNA to prematurely combine with the fuel and ignite outside the combustion chamber.

SUMMARY OF THE INVENTION

A gas-dispensing, piercing pintle is concentrically housed over a stub inside a canister. The canister is covered by a diaphragm and forms a cap over the open end of a pressure conducting stand-pipe, and is submerged in the oxidizer liquid in a rocket-powered drone. Upon opening the pressure source, the piercing pintle is forced through the diaphragm and rises above the level of the oxidizer to pressurize the oxidizer tank.

It is therefore an object of the present invention to provide a gas-pressurizer that operates simply and efficiently.

It is a further object of the invention to provide a gas-pressurizer that may be used to initiate a hypergolic reaction but that will work reliably and safely.

It is a still further object of the invention to provide a gas-pressurizer that may be installed in a target drone and safely stored over a period of years.

These and other objects of this invention will appear from the following specification, and are not to be construed as limiting the scope of the invention thereto, since in view of the disclosure herein, others may be able to make additional embodiments within the scope of the appended claims.

DESCRIPTION OF THE PREFERRED EMBODIMENT

Figure 1:
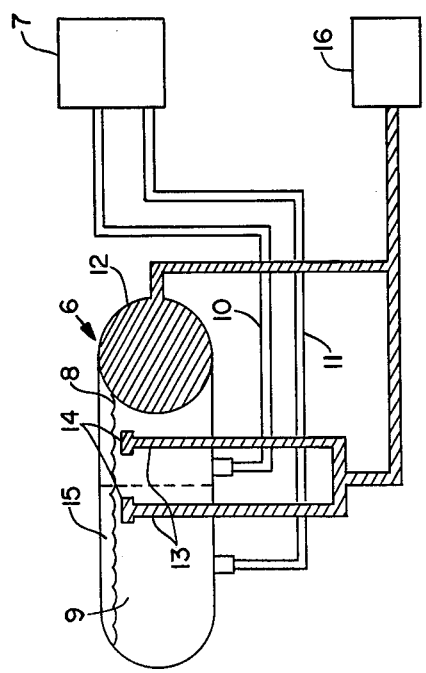
FIG. 1 is a sectional view of the fuel compartment of a hypergolic system utilizing the instant invention.

Referring now to the drawings, FIG. 1 shows a sectional view of the fuel compartment 6 of a hypergolic rocket system. The fuel 8 and oxidizer 9 flow through lines 10 and 11, respectively, to the combustion chamber in an engine 7. Pressurized gas is stored in tank 12 and flows through pressure standpipes 13 to a gas pressurizer 14 placed in the fuel 8 and oxidizer 9. A fill-port 16 is used to fill tank 12.

Figure 2:
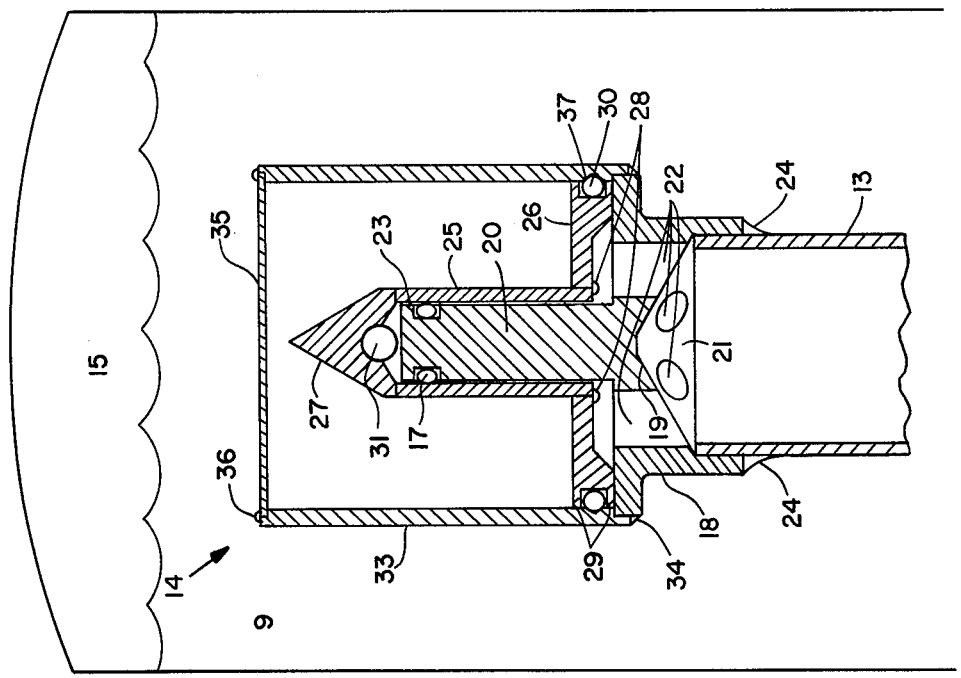
FIG. 2 is a cross-sectional view taken along the longitudinal axis of a gas pressurizer as shown in FIG. 1.

FIG. 2 shows a cross-sectional view taken along the longitudinal axis of pressurizer 14. Pressurizer 14 is actually composed of three sub-elements: a circular endcap/stub 18 to fit over the end of standpipe 13; a canister 33 and a diaphragm 35 to fit concentrically around endcap/stub 18; and a piercing pintle 25 and pintle skirt 26, that ride up over endcap/stub 18.

Endcap/stub 18 is a solid piece of material in the form of a disc 19 with a column 20 extending from the middle thereof. Disc 19 is of a predetermined diameter and thickness to tightly fit over the end of standpipe 13. A counterbore 21 is drilled into the center of disc 19 and a plurality of pressure ports 22 extend through the disc to the other side. Column 20 has a groove 23 circumscribed about its upper end, and an o-ring 17 set therein. Endcap/stub 18 is securely and hermetically joined to standpipe 13, as by welding at points 24, or using other techniques well-known in industry.

A piercing pintle 25 and pintle skirt 26 are placed over column 20. Pintle 25 is of a cylindrical form, and carries a piercing top 27. A plurality of pressurizing bores 31 extend through top 27. Pintle skirt 26 is of a circular form and is hermetically secured by welding to pintle 25 at a circumference 28. There is a bifurcation 29 around the outer edge of skirt 26, and a second o-ring 30 is set inside bifurcation 29, to slightly extend outside thereof.

A canister 33 is secured around the outer edge of endcap/stub 18 by welding, or using any other suitable process, at its bottom edge 34. A circular diaphragm 35 of a predetermined thickness is secured to the top edge 36 in a like manner. Canister 33 has an o-ring lock groove 37 circumscribed at the bottom of the inner wall. Bi-furcation 29 and o-ring 30 form a hermetic seal with groove 37. All parts of gas pressurizer 14, except o-rings 17 and 30, are made of a non-magnetic stainless steel, similar to the types found in the 300-series known to the industry. O-rings 17 and 30 are made from a fluorocarbon so as not to react with oxidizer 9 or its distillates.

The operation of gas pressurizer is as follows: at a predetermined time, pressurized gas is released from source 12 and travels through standpipe 13 to gas pressurizer 14. The gas is forced through pressure ports 22 in endcap/stub 18 against pintle skirt 26. The force is sufficient to drive piercing pintle 25 through diaphragm 35 until pressurizing holes 31 open into ullage space 15. The resulting pressure on oxidizer 9 and fuel 6 forces them into engine 7.

It is understood that the above description is merely illustrative of preferred embodiments of the invention of which many variations may be made within the scope of the following claims without departing from the spirit thereof.

What is claimed is:

1. A pressurizing system for a caustic liquid environment comprising:

a tank having a volume for containing a caustic liquid below a ullage space therein;

a standpipe connected to an external source of gas pressure and located within said volume for containing a caustic liquid and having a length chosen to terminate a predetermined distance beneath the ullage space;

a canister attached to and enclosing said standpipe having a length chosen to lie within said volume for containing a caustic liquid to form an actuator cylinder communicating with said source of gas pressure;

a thin metal diaphragm attached about its periphery to form a liquid tight seal thereby closing said canister; and a piercing pintle having a skirt portion fitted within said canister said skirt portion being dimensioned to seal said actuator cylinder within said canister to form a piston with said piercing pintle extending therefrom, said piercing pintle being dimensioned to fit within said canister when said skirt is in a first position adjacent said standpipe and to extend within said ullage space where said skirt is moved to a second position remote from said standpipe by the pressure of the gas in said standpipe.

2. A pressurizing system according to claim 1 wherein said piercing pintle has a tubular body portion with a pointed closure end having apertures communicating between said tubular body and the outer surface of said pointed closure end.

3. A pressurizing system according to claim 1 further comprising:

a disc member attached to the end of said standpipe and having a counter bore and a plurality of pressure ports extending therethrough to transfer of gas under pressure therethrough; and a stub extending upwardly from said disc member and configured to cooperate with said piercing pintle to provide a guide therefor.

4. A pressurizing system according to claim 1 further comprising:

a disc member attached to said standpipe said disc member being configured to pass pressurized gas therethrough to said canister;

a stub connected to and supported by said disc and extending into a cooperating cavity within said piercing pintle; and seal means mounted on said stub at a position remote from said disc member and configured to cooperate with said cavity within said piercing pintle to form a gas tight seal therewith.

5. A pressurizing system according to claim 1 further comprising:

a skirt seal carried on the circumferential edge of said skirt and dimensioned to enhance the sealing action between said skirt and the walls of said actuator cylinder.

6. A pressurizing system according to claim 1 in which said standpipe, canister, and thin metal diaphragm are made of non-magnetic stainless steel.

7. A pressurizing system according to claim 1 wherein said piercing pintle has a tip configured to penetrate said thin metal diaphragm.

* * * * *